United States Patent [19]

Shiber

[11] Patent Number: 4,493,385
[45] Date of Patent: Jan. 15, 1985

[54] ALL TERRAIN VEHICLE

[76] Inventor: Samuel Shiber, P.O. Box 371, Mundelein, Ill. 60060

[21] Appl. No.: 497,884

[22] Filed: May 25, 1983

[51] Int. Cl.$^3$ ............................................. B62D 11/08
[52] U.S. Cl. ..................................................... 180/6.2
[58] Field of Search ...................... 180/6.2, 6.44, 6.48, 180/6.58, 6.66

[56] References Cited

U.S. PATENT DOCUMENTS

| | | | |
|---|---|---|---|
| 1,375,882 | 4/1921 | Wilson | 180/6.2 |
| 3,601,834 | 8/1971 | Dyreng | 180/6.2 |
| 3,623,565 | 11/1971 | Ward et al. | 180/6.2 |
| 4,174,013 | 11/1979 | Yago | 180/6.2 |

Primary Examiner—John A. Pekar
Attorney, Agent, or Firm—Samuel Shiber

[57] ABSTRACT

An all terrain vehicle equipped with an internal combustion engine which is connected to a torque responsive continuously variable transmission which in turn is connected to a simple automotive type differential. One output of the differential is connected to the right wheels and the other to the left wheels. The distance between the front to rear wheels, which are non-steerable, is smaller than the distance between right and left wheels to mimimize the vehicle's resistance to skid steering. Split brake system to allow steering right by braking the right wheels and steering left by braking the left wheels.

2 Claims, 3 Drawing Figures

ALL TERRAIN VEHICLE

BACKGROUND OF THE INVENTION

The present invention relates to a wheeled vehicle and in particular to vehicles which are steered by braking the wheels on one side of the vehicle while continuing to drive the other side (skid steering). Such vehicles which are used primarily off the road, have strong and simple chassis, but they require a more complex drive-line to allow the braking of the wheels on the one side while momentarily increasing the torque to the wheels on the other side to compensate for the extra work being done when the wheels skid sideways in order to turn.

An object of the present invention is to provide a design which will retain the advantages of a skid steered vehicle but will not require a complex drive-line.

SUMMARY OF THE DISCLOSURE

The present invention achieves the above object by combining unconventional dimensional characteristics in the chassis' layout together with certain specific design characteristics in the drive-line. In most conventional vehicles the length of the wheel-base (distance between front to rear wheels) is substantially longer than its width (the distance between the right and the left wheels). In the present invention these proportions are reversed, and the significance of this fact will become clear from the following example: When turning rightwards, the left wheels rotate the vehicle around the braked right wheels. Thus, on the one hand the further the left wheels are from the right wheels the longer an arm of moment they have to act on. On the other hand, the moment resisting the process of skid steering increases with the distance between front to rear wheels which are skidding. Therefor, by reversing the wheel-base proportions, the momentary increase in torque caused by skid-steering is reduced to a size that can be handled by a drive-line made of selected, but conventional components. A preferred drive-line contains a drive and a driven variable sheaves connected by a V-belt, where the driven sheave automatically increases its effective diameter in response to torque that it is called to deliver, causing the effective diameter of the drive sheave to decrease and thereby shifting the transmission to increase its torque multiplication.

DETAILED DESCRIPTION OF THE FIGURES

Figure 1:
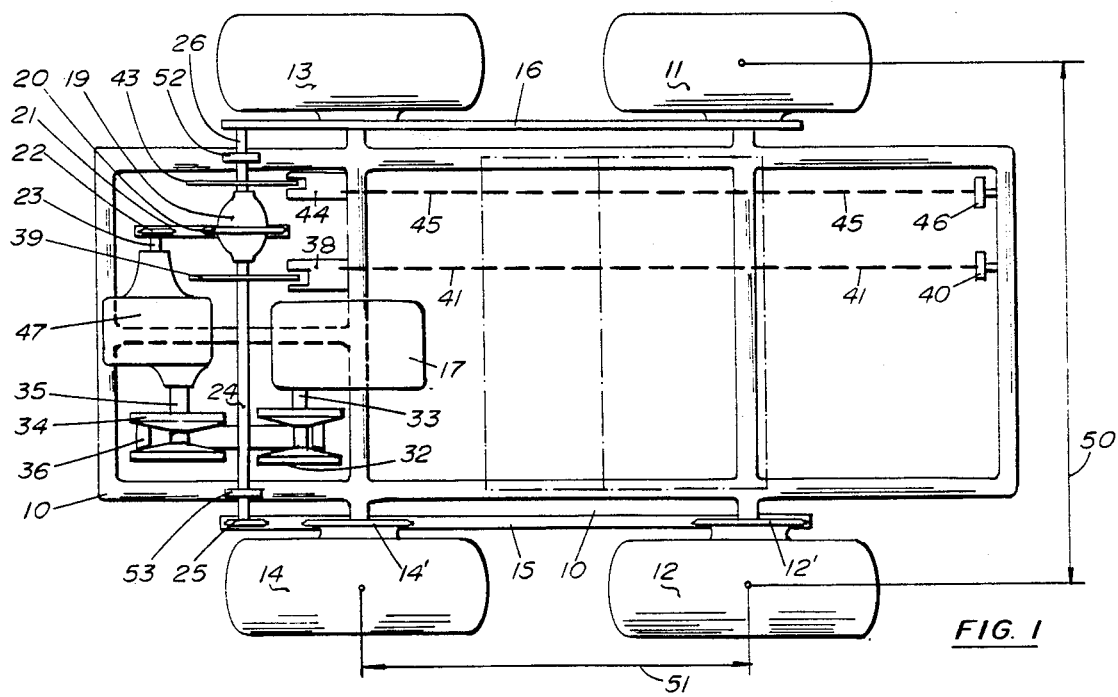
FIG. 1 shows a top view of an embodiment according to the present invention.
Figure 2:
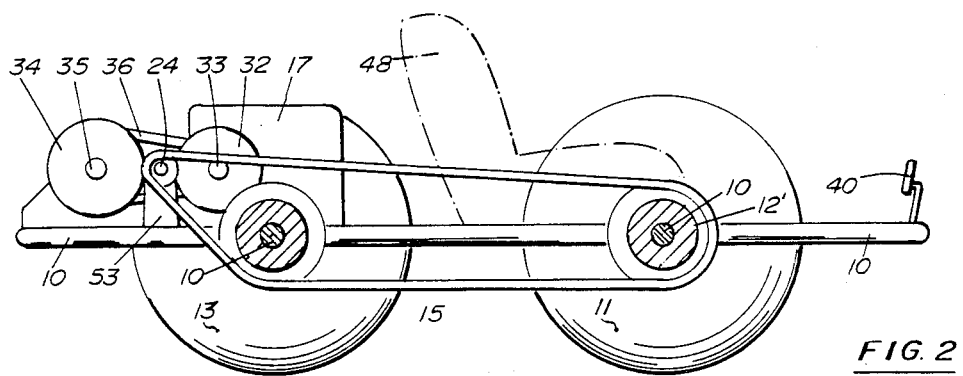
FIG. 2 shows a side view of the embodiment with the two right wheels partially removed (the sprocket section of these wheels is shown)
Figure 3:
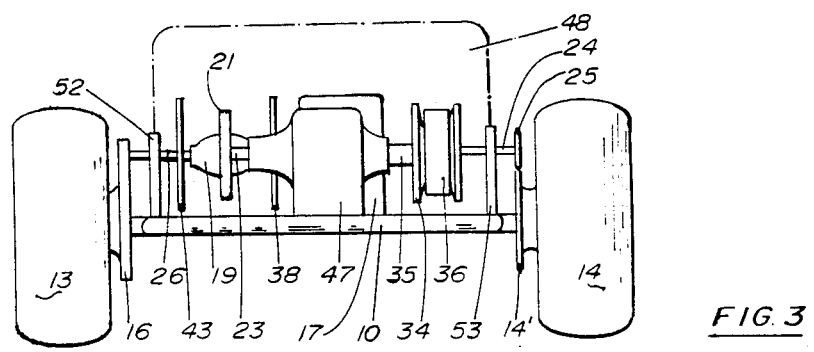
FIG. 3 shows a rear view of the embodiment.

The FIGURES show an all terrain vehicle comprising:
a frame 10,
four driven wheels 11, 12, 13 & 14, rotatably mounted on the frame, each wheel having a respective sprocket 11', 12', 13' & 14' affixed to it. The wheels constitute a pair of front wheels, 11 & 12, and a pair of rear wheels 13 & 14, and also a pair of left wheels 11 & 13 and a pair of right wheels 12 & 14, the right wheels being interconnected by an endless roller chain 15 to rotate together and the left wheels being interconnected by an endless roller chain 16 to rotate together.

An engine 17, is mounted on the frame 10.

A differential 19 having an input in the form of a sprocket 20 for accepting power from the transmission through an endless roller chain 21 and a sprocket 22 which is affixed to transmission's output shaft 23, and two outputs, a right output shaft 24 carrying a sprocket 25 which meshes with the endless chain 15 through which it is connected to the right pair of wheels and a left output shaft 26 carrying a sprocket which meshes with endless chain 16 through which it is connected to the left pair of wheels. The shafts 24 & 26 are supported by conventional bearing pillow blocks 53 & 52, respectively.

A distance between the left pair of wheels to the right pair of wheels, marked by dimension 50, being substantially larger than a distance between the front pair of wheels to the rear pair of wheels, marked by dimension 51.

A torque responsive continuously variable transmission has a variable drive sheave 32 which is mounted on an output shaft 33 of the engine 17, a variable driven sheave 34 connected to an input shaft 35 of a forward-/reverse unit 47 and an endless flexible (bendable but non-stretchable) belt 36 connecting the sheaves. The driven sheave 34 is made to increase its effective diameter in response to an increase in torque that it transmits to the unit 47, which in turn causes the drive sheave 32 to decrease its effective diameter (since the endless belt does not stretch), thereby, the transmission ratio between the engine and the differential 19 is increased with a corresponding increase of torque at the differential. The drive sheave 32 is equipped with optional means to urge its effective diameter to increase in response to an increase in engine's speed. Variable sheaves of this type are commonly used in snowmobile transmissions and in various industrial applications, and they are manufactured by Comet division of Hoffco Inc, which is located in Richmond, Ind., in various sizes, and is described in their literature #2457 dated April 1975, which is herein being incorporated by reference.

The brake system is split to allow the driver to brake the wheels on either side of the vehicle independently. A right brake comprises a disc 38 which is affixed to the shaft 24, a caliper brake mechanism 39, acutable by a pedal 40 via rod 41. Similarly, the left brake comprises disc 43, caliper 44, rod 45 and pedal 46.

OPERATION AND DISCUSSION OF THE INVENTION

Once the forward/reverse unit is shifted (by a handle not shown) and the driver increases engine's speed (via conventional control means which are not shown) the drive sheave 32 automatically engages the belt 36, acting as a clutch and the vehicle starts moving. To brake, both pedals 40 & 46 are pushed. To turn right the driver pushes on the pedal 40 which frictionally engages the caliper 39 with the disc 38, slowing the right wheels 12 and 14 relative to the left wheels 11 and 13. The differential 19, which is constructed similarly to a simple conventional automotive differential, transfers the rotation from the right wheels to the left wheels, but being a simple automotive differential it cannot increase the torque to the left wheels. The additional torque requirement caused by the turning process causes the driven sheave 34 to increase its effective diameter, which in turn causes additional belt length to become wrapped around the driven sheave 34 which in turn pulls the belt 36 deeper into the drive sheave 32 reducing its effective diameter with the overall result being the increse of the transmission ratio between the engine 17 to the differential 19 and thereby supplying the additional torque to the wheels needed for the turning process. Using a continuously variable transmission is essential to avoid shock and interuption of power flow to the wheels during the turn. However, the practical range of this type of transmission is narrow, and tests have shown that the additional torque that is generated by the turning process should be minimized by keeping the distance between front to rear wheels to be less than the distance between the right and left wheels (distance between wheels is measured between the center of their pressure area to the ground).

To conclude, by combining unconventionally proportioned wheel base with a continuously variable torque responsive transmission this invention results in a simple, rugged, light and inexpensive vehicle design which is particularly suitable for small all terrain vehicles.

While the present invention has been illustrated with a single embodiment, it should be understood that various modifications and substitutions can be made without departing from the scope of the claims and the spirit of the invention.

I claim:

1. An all terrain vehicle comprising in combination:
    a frame,
    four driven, non-steerable wheels, rotatably mounted on said frame, said wheels constituting a pair of front wheels and a pair of rear wheels, said wheels also constituting a pair of left wheels and a pair of right wheels, said right wheels being interconnected to rotate together and said left wheels being interconnected to rotate together,
    an engine, mounted on said frame,
    a torque responsive continuously variable transmission adapted to accept power from said engine,
    a differential having an input for accepting power from said transmission and two outputs, a right output connected to said right pair of wheels and a left output connected to said left pair of wheels,
    a split brake system allowing to selectively brake said right wheels or said left wheels,
    a distance between said left pair of wheels to said right pair of wheels being larger than a distance between said front pair of wheels to said rear pair of wheels.

2. The subject matter of claim 1, wherein said torque responsive continuously variable transmission has a variable drive sheave connected to said engine, a variable driven sheave connected to said differential and an endless flexible belt connecting said sheaves, said driven sheave adapted to increase its effective diameter in response to an increase in torque transmitted by said driven sheave to said differential.

* * * * *